US 8,250,086 B2

(12) United States Patent
Coutts et al.

(10) Patent No.: US 8,250,086 B2
(45) Date of Patent: Aug. 21, 2012

(54) WEB SERVICES ACCESS WITH SHARED SQL

(75) Inventors: Michael Coutts, Scotland (GB); Alnasir Ladha, Markham (CA); Lorenzo Danesi, Richmond Hill (CA)

(73) Assignee: Teradata U S, Inc., Dayton, OH (US)

( * ) Notice: Subject to any disclaimer, the term of this patent is extended or adjusted under 35 U.S.C. 154(b) by 907 days.

(21) Appl. No.: 12/202,462

(22) Filed: Sep. 2, 2008

(65) Prior Publication Data
US 2010/0057705 A1 Mar. 4, 2010

(51) Int. Cl.
*G06F 7/00* (2006.01)
*G06F 17/30* (2006.01)
(52) U.S. Cl. .................................................. 707/760
(58) Field of Classification Search .................. 707/760, 707/999.004
See application file for complete search history.

(56) References Cited

U.S. PATENT DOCUMENTS

2004/0243987 A1* 12/2004 Yellin ........................... 717/151
2009/0080408 A1* 3/2009 Natoli et al. ................... 370/351

* cited by examiner

*Primary Examiner* — Kimberly Lovel
(74) *Attorney, Agent, or Firm* — Randy Campbell

(57) ABSTRACT

A method of providing enterprise applications with shared access to a data warehouse. A web service request is issued over a data network from a first client enterprise application to a second server enterprise application. A database query is then constructed at the second server enterprise application. It is then determined whether a response to the web service request will include the results of posing the database query against the data warehouse, or the SQL syntax necessary to pose the query. If the response is to include the results of posing then the second server enterprise application poses the query against the data warehouse and issues the results to the first client enterprise application. If the response to the request is to include the SQL syntax necessary to pose the query, then the second server enterprise application provides the database query syntax to the first client enterprise application.

12 Claims, 2 Drawing Sheets

WEB SERVICES ACCESS WITH SHARED SQL

BACKGROUND

A data warehouse provides an environment within which all of a company's data is contained, managed analyzed and presented to members of the business. Enterprise applications increasingly use the contents of the data warehouse. Methods of communication include online with access for human interaction and web services access for business to business interaction. As the number of these interactions increases, the load on the data warehouse increases.

There is a need to prioritize and partition access to the finite resources of a data warehouse environment. Where multiple enterprise applications co-exist on a single data warehouse there is the potential for conflict for the available resources of the data warehouse. These conflicts are addressed by partitioning processing capability between the different business groups of the organization that own the individual enterprise applications. Each business group contributes to the cost of the data warehouse and is apportioned an appropriate amount of the daily capacity and data processing capability of the data warehouse.

Where the enterprise applications exist as separate entities on a single enterprise data warehouse, each application is responsible for its own use of the data warehouse and the associated costs.

One problem arises where one application provides access to its online capabilities to a second enterprise application. This configuration pushes the responsibility, authority and financial penalty for accessing the enterprise data warehouse onto the enterprise application that provides the service. This approach places a great deal of responsibility upon the called enterprise application while allowing the calling enterprise application to divest responsibility for the processing of the potentially expensive query within the enterprise data warehouse.

SUMMARY

Described below is a method of providing two or more enterprise applications with shared access to a data warehouse.

A web service request is issued over a data network from a first client enterprise application to a second server enterprise application. The web service request is processed at the second server enterprise application. A database query is constructed at the second server enterprise application.

It is then determined whether a response to the web service will include the results of posing the database query against the data warehouse or the SQL syntax necessary to pose the query against the data warehouse.

If the response to the web service is to include the results of posing the database query against the data warehouse then the second server enterprise application poses the constructed query against the data warehouse, obtains the results of the query and formats the results of the query for issuing to the first client enterprise application over the data networks. The results of the query are then issued to the first client enterprise application as a response to the web service request.

If the response to the web service is to include the SQL syntax necessary to pose the query against the data warehouse then the second server enterprise application issues the database query syntax to the first client enterprise application as a response to the web service request.

Also described below is a shared access system for a data warehouse. The system includes a first client enterprise application having access to a data warehouse, a second server enterprise application having access to the data warehouse, and a data network permitting data transfer between the first client enterprise application and the second server enterprise application.

The first client enterprise application is configured to issue a web service request over the data network to the second server enterprise application.

The second server enterprise application is configured to issue a web service response to the first client enterprise application over the data network, the web service response including, determined by the second server enterprise application, either the results of posing a database query against the data warehouse or the SQL syntax necessary to pose the query against the data warehouse.

Also described below is computer readable media having stored thereon computer executable instructions for performing a method of providing two or more enterprise applications with shared access to a data warehouse.

DETAILED DESCRIPTION

Figure 1:
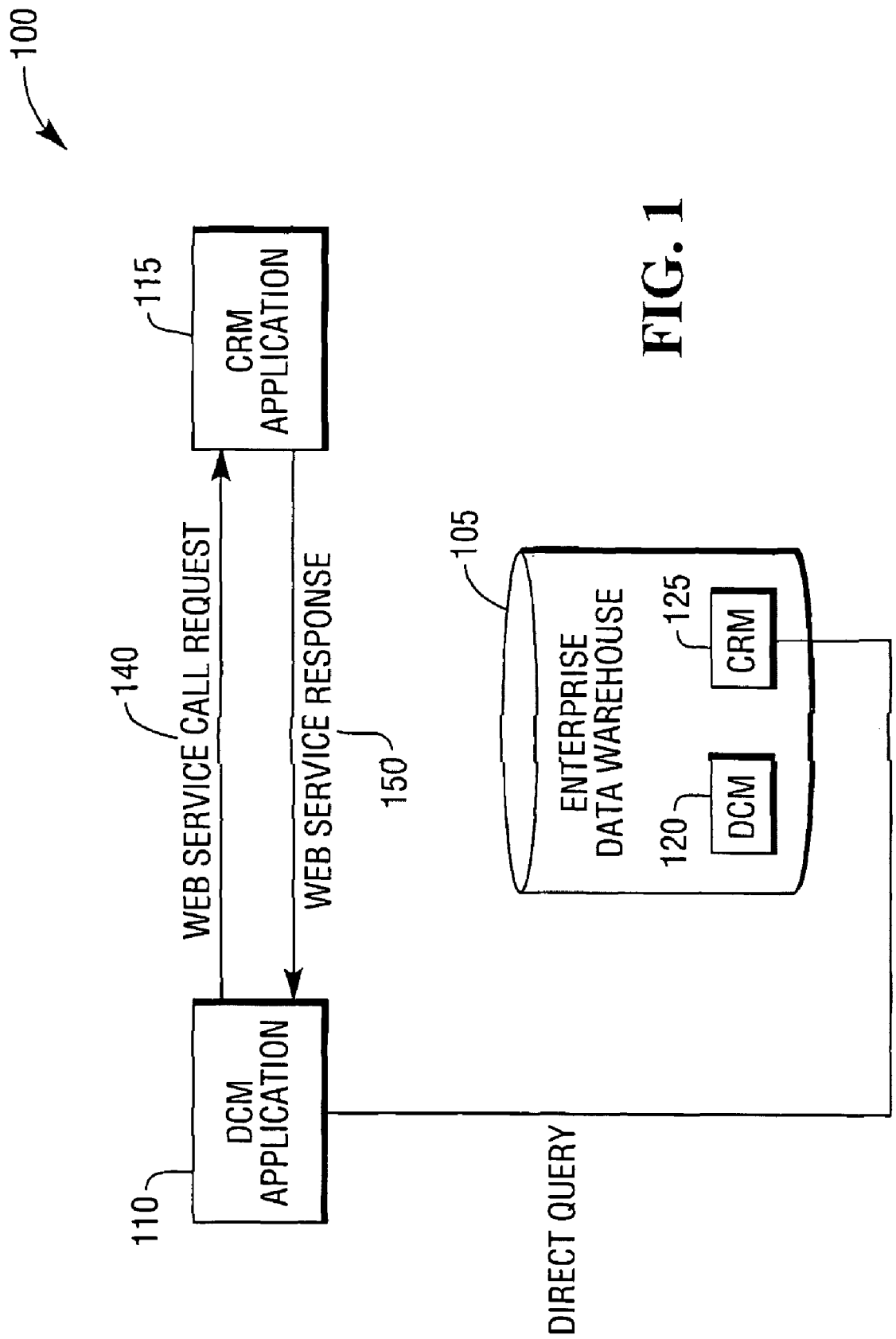
FIG. 1 shows a high level schematic data warehouse system.

FIG. 1 shows a high level schematic data warehouse system 100. The system includes an enterprise data warehouse 105. The data warehouse 105 is configured for use for a retailer. The data warehouse 105 stores records of a retailers existing inventory and customer base as well as historical records of all the items the retailer has sold in the past few years and to whom the items were sold.

The retailer has two primary business intelligence applications that use this data warehouse 105. These include a demand chain management (DCM) application and a customer relationship management (CRM) application 115.

DCM application 110 is used to predict, based upon historical trends, the likely demand for goods the retailer sells based on factors such as seasonality, weather, competitive pricing behaviour and so on.

CRM application 115 is used to identify, based upon previous buying behaviour, which of the company's customers it would be best to market product offers to.

These two activities operate as independent entities. An individual retailer might have DCM application 110 or CRM application 115 or both. It would be advantageous if where a retailer has both DCM application 110 and CRM application 115, that the two applications provide each other with some insight into their data. For example it might be advantageous for DCM application 110 to see what CRM campaigns are currently running as this would most likely have an influence upon the expected demand for these products.

The data warehouse 105 includes data relevant for the DCM application identified as DCM 120 and includes CRM data 125 relevant for the CRM application 115.

In system 100 one of the applications can call upon the other application. In this case DCM application 110 as a first client enterprise application makes a web service request 140 to CRM application 115 as a second server enterprise application. An example web service request 145 would be "get current campaigns".

In an alternative embodiment a rich client application makes web service request 140 to the second server application. References to a first client enterprise application include a rich client application calling the second server application.

The second server enterprise application constructs a database query designed to retrieve data that will satisfy the received web service request or request.

The CRM application 115 poses the constructed query against the data warehouse. The application 115 obtains the results of the query and formats the results of the query for return to a DCM application 110 over a data network. The results are packaged as an appropriate web service response 150 to the web service call 140.

In some cases the data to be sent as a web service response 150 comprises an extensive set of information. This information requires a large amount of data to be extracted from the data warehouse 105, formatted and transferred across a network from the CRM application 115 to the DCM application 110. A further complication is that the CRM server application 115 is required to use some of its allocation of database resources to benefit not itself but another application.

One solution is to enable the CRM application to determine what it will send as a response to a web service request. It may well determine to include in the response to the web service request, the results of posing the database query against the data warehouse.

In other cases the CRM application 115 does not access data warehouse 105 itself and incur the cost penalty for doing so. The CRM application 115 has already constructed the query necessary to access the data warehouse. The web service response 150 includes not the results of the query but the SQL syntax necessary to pose the query against the data warehouse. This allows the DCM application 110 to itself pose the received query against the CRM tables 125 within the data warehouse 105.

There are at least two different reasons why CRM application 115 would determine to send the SQL syntax as a response to the web service. The two circumstances are:

1) if the query is likely to generate a large number of results;

2) if the query would utilize a large amount of processing capability.

If the query is likely to generate a large number of results in some cases it will be time consuming to format the results into an XML/web services response 150. There will be further delays in transmitting the formatted response across the network between the two applications. In this case the combined cost of formatting the results of the query and issuing the results of the query to the first client enterprise application would exceed the cost of issuing the database query syntax as a response to the web service request.

If a query would use a large amount of processing capability within a data warehouse it is appropriate to log and apportion that usage to the application for whose benefit the query is made. In this case it will be the client calling application rather than the server application. A further benefit is that it is possible to better prioritize the workload within the data warehouse 105 from the client's perspective. For example DCM application 110 may wish to run a query at a different level of prioritization than the CRM application may be prepared to do. It may be more important to the client application to run the query and the client application may be prepared to pay a premium for priority use of such resources.

In this case the combined cost of the second server enterprise application posing the constructed query against the data warehouse and obtaining the results would exceed a predefined maximum cost. In one embodiment the server application determines a priority and cost in advance. Based on this information it can then elect to issue the database query syntax within the response rather than the results of posing the database query against the data warehouse.

Described below is a set of simple XML schema. The schema describe a sample web service that enables a first client enterprise application to call upon a web service method called getCampaigns. The preferred form XML schema has the following parameters:

```
<?xml version="1.0" encoding="UTF-8"?>
<xsd:schema
  xmlns:xsd="http://www.w3.org/2001/XMLSchema"
  xmlns="http://teradata.com/SOAP-SQL/service/schemas"
  xmlns:s="http://teradata.com/SOAP-SQL/service/schemas"
  elementFormDefault="qualified"
  id="SOAP-SQL-Schemas"
  targetNamespace="http://teradata.com/SOAP-SQL/service/schemas">
  <!-- Include the Individual Business Object Schemas to be used
  -->
  <xsd:include schemaLocation="CampaignDetails.xsd"/>
  <xsd:include schemaLocation="CampaignSQL.xsd"/>
  ...
  ...
</xsd:schema>
```

The web service request includes an input parameter called CampaignRequest. The schema described above includes a CampaignRequest element. The CampaignRequest element includes a string element representing a customer identifier (customer ID). It is expected that the customer ID is a string that could represent an ATM card number, phone number, or other string that uniquely identifies a customer.

The following XML defines the CampaignRequest within the above schema:

```
<!-- CampaignRequest is the Input Parameter set of the
  getCampaigns Method -->
    <xsd:element name="CampaignRequest">
      <xsd:complexType>
        <xsd:sequence>
          <xsd:element name="CustomerID" type="xsd:string"/>
        </xsd:sequence>
      </xsd:complexType>
    </xsd:element>
```

The second server enterprise application receives the web service request 140 from the first client enterprise application and formulates a web service response 150. The second server enterprise application constructs a database query. One example of a query is:

SELECT offerCode, offerMessage where CustomerID=<??>

The <??> placeholder is filled in with the customerID from the CampaignRequest included in the web service request 140. The query returns 0 or more rows of data. The data represents possible offers for this customer.

It is envisaged that result processing would be performed within SQL such as ordering the results. In some cases a database stored procedure would be called upon to perform active analytics such as determining a specified number of top offers.

The web service response 150 includes a CampaignResponse. The schema described above includes a CampaignResponse element. The following XML defines the CampaignResponse within the above schema:

```
<!-- CampaignResponse is the Output Parameter set of the
getCampaign Method -->
    <xsd:element name="CampaignResponse">
      <xsd:complexType>
        <xsd:sequence>
          <xsd:element maxOccurs="unbounded" nillable="true"
name="campaignDetails" type="s:CampaignDetails"/>
          <xsd:element name="campaignSQL" nillable="true"
type="s:CampaignSQL"/>
        </xsd:sequence>
      </xsd:complexType>
    </xsd:element>
```

If the second server enterprise application determines to send the results of posing the database query against the data warehouse then it populates the campaignDetails element of the CampaignResponse element. The campaignDetails element is defined by the example XML:

```
        <xsd:element maxOccurs="unbounded" nillable="true"
    name="campaignDetails" type="s:CampaignDetails"/>
```

The element includes the maximum number of occurrences (maxOccurs). The unbounded type of maxOccurs represents the fact that the query could return zero or more elements or rows. The element is "nillable" meaning that it does not need to appear at all in the web service response 150. The web service response will still be sent if there are no rows returned from the query or if the second server enterprise application elects not to return rows but instead returns the SQL.

If the second server enterprise application decides to return the SQL within the web service response then it populates the campaignSQL element of the CampaignResponse element. The campaignSQL element is defined by the example XML:

```
        <xsd:element name="campaignSQL" nillable="true"
    type="s:CampaignSQL"/>
```

This element is "nillable" meaning that it does not need to be included in the web service response.

It is anticipated that the CampaignDetails element and the campaignSQL element are mutually exclusive. One of them must appear within the web service response but not both.

The CampaignDetails element is further defined using the following XML schema:

```
<?xml version="1.0" encoding="UTF-8"?>
<xsd:schema
 xmlns:xsd="http://www.w3.org/2001/XMLSchema"
 xmlns="http://teradata.com/SOAP-SQL/service/schemas"
 xmlns:s="http://teradata.com/SOAP-SQL/service/schemas"
 elementFormDefault="qualified" id="ClientDetails"
 targetNamespace="http://teradata.com/SOAP-SQL/service/schemas">
 <!-- Campaign - Information about the Campaign we wish to
present to a customer. -->
 <xsd:complexType name="CampaignDetails">
   <xsd:sequence>
     <!-- Campaign Code used to identify remote material
associated with a Marketing Campign -->
 <xsd:element name="code" nillable="false" type="xsd:integer"/>
       <!-- Campaign Message used to provide dynamic text content
associated with a Marketing Campaign -->
     <xsd:element name="message" nillable="false"
type="xsd:string"/>
   </xsd:sequence>
 </xsd:complexType>
</xsd:schema>
```

The customerSQL element is further defined using the following XML schema:

```
<?xml version="1.0" encoding="UTF-8"?>
<xsd:schema
 xmlns:xsd="http://www.w3.org/2001/XMLSchema"
 xmlns="http://teradata.com/SOAP-SQL/service/schemas"
 xmlns:s="http://teradata.com/SOAP-SQL/service/schemas"
 elementFormDefault="qualified" id="CustomerDetails"
 targetNamespace="http://teradata.com/SOAP-SQL/service/schemas">
 <!-- CustomerSQL - The Database logon and SQL information
required to get CampaignDetails -->
 <xsd:complexType name="CampaignSQL">
   <xsd:sequence>
     <!-- Username and Password required to access the database
in order to issue the SQL -->
     <xsd:element name="username" nillable="true"
type="xsd:string"/>
     <xsd:element name="password" nillable="true"
type="xsd:string"/>
     <!-- SQL required to obtain the campaigns for the given
user ID -->
     <xsd:element name="sql" nillable="false"
type="xsd:string"/>
   </xsd:sequence>
 </xsd:complexType>
</xsd:schema>
```

The campaignSQL schema shown includes provision for a user name and password. Both are "nillable" meaning that they don't have to be within a campaignSQL data set. The user name and password are sometimes necessary for the second server enterprise application to provide the first client enterprise application with appropriate credentials in order to access the database. It will be appreciated that there will be appropriate mechanisms in place regarding security issues required for a server to hand off SQL and user password credentials to a client.

Figure 2:
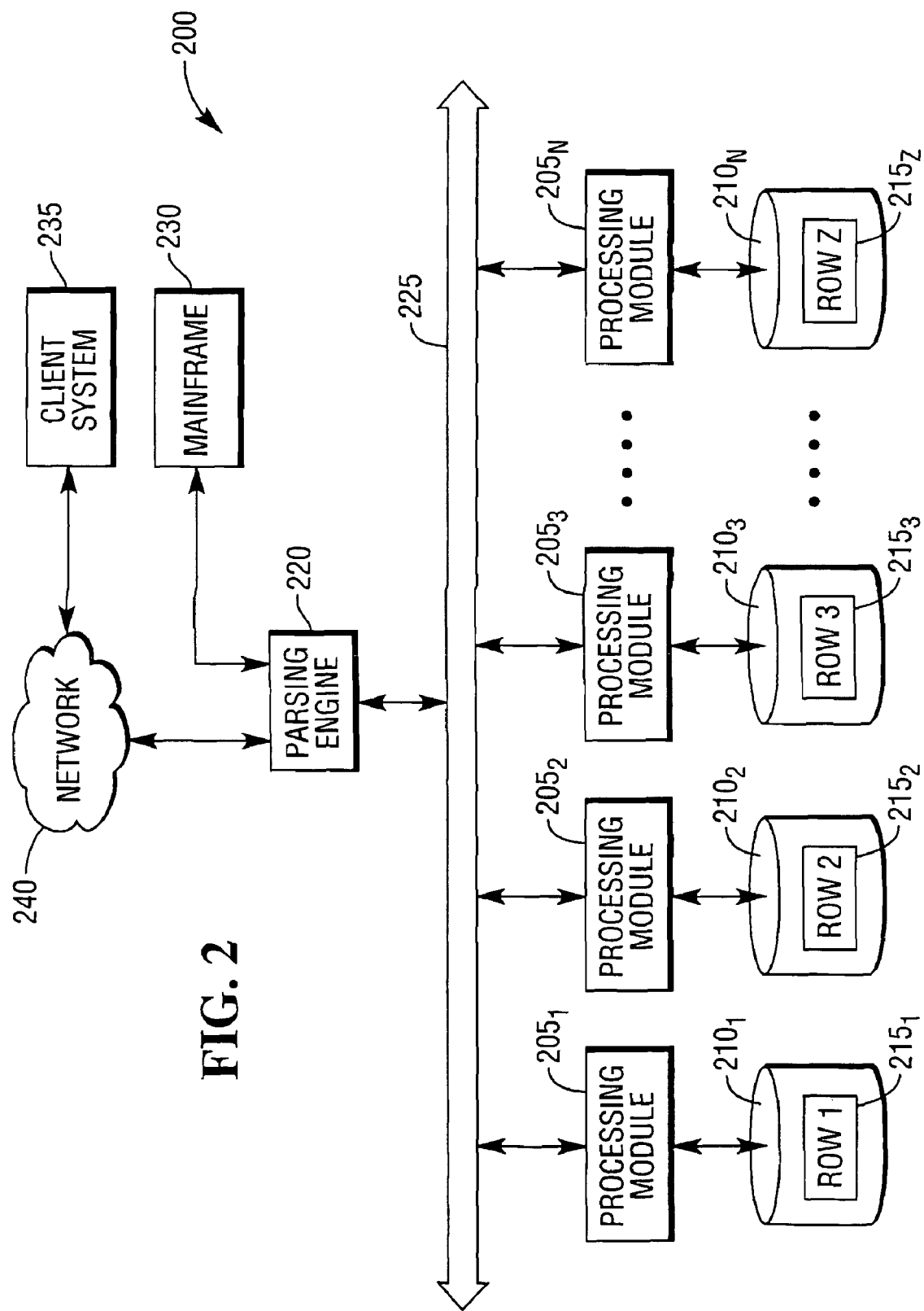
FIG. 2 shows a sample database system in which the data warehouse of FIG. 1 is implemented.

FIG. 2 shows an example of a database system 200, such as a Teradata Active Data Warehousing System available from Teradata Corporation. Database system 200 is an example of one type of computer system in which the data warehouse system 100 above is implemented.

In computer system 200, vast amounts of data are stored on many disk-storage facilities that are managed by many processing units. In this example, the data warehouse 200 includes a relational database management system (RDMS) built upon a massively parallel processing (MPP) platform.

Other types of database systems, such as object-relational database management systems (ORDMS) or those built on symmetric multi-processing (SMP) platforms are also suited for use here.

The data warehouse 200 includes one or more processing modules $205_{1 \ldots N}$ that manage the storage and retrieval of data in data-storage facilities $210_{1 \ldots N}$. Each of the processing modules $205_{1 \ldots N}$ manages a portion of a database that is stored in a corresponding one of the data-storage facilities $210_{1 \ldots N}$. Each of the data-storage facilities $210_{1 \ldots N}$ includes one or more disk drives.

The system stores data in one or more tables in the data-storage facilities $210_{1 \ldots N}$. The rows $215_{1 \ldots Z}$ of the tables are stored across multiple data-storage facilities $210_{1 \ldots N}$ to ensure that the system workload is distributed evenly across the processing modules $205_1 \ldots _N$. A parsing engine 220 organizes the storage of data and the distribution of table rows $215_1 \ldots _Z$ among the processing modules $205_1 \ldots _N$. The parsing engine 220 also coordinates the retrieval of data from the data-storage facilities $210_1 \ldots _N$ over network 225 in response to queries received from a user at a mainframe 230 or a client computer 235 connected to a network 240. The database system 200 usually receives queries and commands to build tables in a standard format, such as SQL.

The text above describes one or more specific embodiments of a broader invention. The invention also is carried out in a variety of alternative embodiments and thus is not limited to those described here. Those other embodiments are also within the scope of the following claims.

The invention claimed is:

1. A method of providing two or more enterprise applications with shared access to a data warehouse, the method comprising:
issuing a web service request over a data network from a first client enterprise application to a second server enterprise application;
processing the web service request at the second server enterprise application;
constructing a database query at the second server enterprise application in response to the web server request;
determining whether a response to the web service will include the results of posing the database query against the data warehouse or database query syntax necessary to pose the query against the data warehouse;
if the response to the web service is to include the results of posing the database query against the data warehouse then:
the second server enterprise application posing the constructed query against the data warehouse;
the second server enterprise application obtaining the results of the query;
the second server enterprise application formatting the results of the query for issuing to the first client enterprise application over the data network;
issuing the results of the query to the first client enterprise application as a response to the web service request;
if the response to the web service is to include the database query syntax necessary to pose the query against the data warehouse then:
the second server enterprise application issuing the database query syntax to the first client enterprise application as a response to the web service request.

2. The method of claim 1 further comprising, where the response to the web service request includes the database query syntax, the first enterprise application posing the database query against the data warehouse.

3. The method of claim 2 further comprising the second enterprise application determining to issue the database query syntax to the first client enterprise application if a combined cost of formatting the results of the query and issuing the results of the query to the first client enterprise application exceeds a cost of issuing the database query syntax as a response to the web service request.

4. The method of claim 2 further comprising the second enterprise application determining to issue the database query syntax to the first client enterprise application if a combined cost of the second server enterprise application posing the constructed query against the data warehouse and obtaining the results of the query exceeds a predefined maximum cost.

5. The method of claim 1, wherein determining whether the response to the web service will include the results of posing the database query against the data warehouse or the database query syntax necessary to pose the query against the data warehouse comprises determining whether the response to the web service will include the results of posing the database query against the data warehouse or SQL syntax necessary to pose the query against the data warehouse.

6. Non-transitory computer readable media having stored thereon computer executable instructions for performing a method of providing two or more enterprise applications with shared access to a data warehouse, the method comprising:
issuing a web service request over a data network from a first client enterprise application to a second server enterprise application;
processing the web service request at the second server enterprise application;
constructing a database query at the second server enterprise application in response to the web service request;
determining whether a response to the web service will include the results of posing the database query against the data warehouse or database query syntax necessary to pose the query against the data warehouse;
if the response to the web service is to include the results of posing the database query against the data warehouse then:
the second server enterprise application posing the constructed query against the data warehouse;
the second server enterprise application obtaining the results of the query;
the second server enterprise application formatting the results of the query for issuing to the first client enterprise application over the data network;
issuing the results of the query to the first client enterprise application as a response to the web service request;
if the response to the web service is to include the database query syntax necessary to pose the query against the data warehouse then:
the second server enterprise application issuing the database query syntax to the first client enterprise application as a response to the web service request.

7. The non-transitory computer readable media of claim 6, the method further comprising, where the response to the web service request includes the database query syntax, the first enterprise application posing the database query against the data warehouse.

8. The non-transitory computer readable media of claim 7, the method further comprising the second enterprise application determining to issue the database query syntax to the first client enterprise application if a combined cost of formatting the results of the query and issuing the results of the query to the first client enterprise application exceeds a cost of issuing the database query syntax as a response to the web service request.

9. The non-transitory computer readable media of claim 7, the method further comprising the second enterprise application determining to issue the database query syntax to the first client enterprise application if a combined cost of the second server enterprise application posing the constructed query against the data warehouse and obtaining the results of the query exceeds a predefined maximum cost.

10. The non-transitory computer readable media of claim 6, wherein determining whether the response to the web service will include the results of posing the database query against the data warehouse or the database query syntax necessary to pose the query against the data warehouse comprises determining whether the response to the web service will include the results of posing the database query against the data warehouse or SQL syntax necessary to pose the query against the data warehouse.

11. A shared access system for a data warehouse comprising:
- a memory device configured to store the data warehouse;
- a first processor in communication with the memory device, the first processor configured to execute a first client enterprise application;
- a second processor in communication with the memory device, the second processor configured to execute a second server enterprise application; and
- a data network in communication with the first processor and the second processor permitting data transfer between the first client enterprise application and the second server enterprise application,
- wherein the first client enterprise application is configured to issue a web service request over the data network to the second server enterprise application, and
- wherein the second server enterprise application is configured to issue a web service response to the first client enterprise application over the data network,
- wherein the web service response includes:
- results of posing a database query against the data warehouse in response to a determination of existence of a first predetermined condition by the second server application; and
- database query syntax necessary to pose the query against the data warehouse in response to a determination of absence of the first predetermined condition by the second server application.

12. The shared access system of claim 11, wherein the web service response includes SQL syntax necessary to pose the query against the data warehouse in response to a determination of absence of the first predetermined condition by the second server application.

* * * * *